W. H. LEWIS.
IRRIGATION MEANS.
APPLICATION FILED AUG. 18, 1919.
1,343,871.
Patented June 15, 1920.
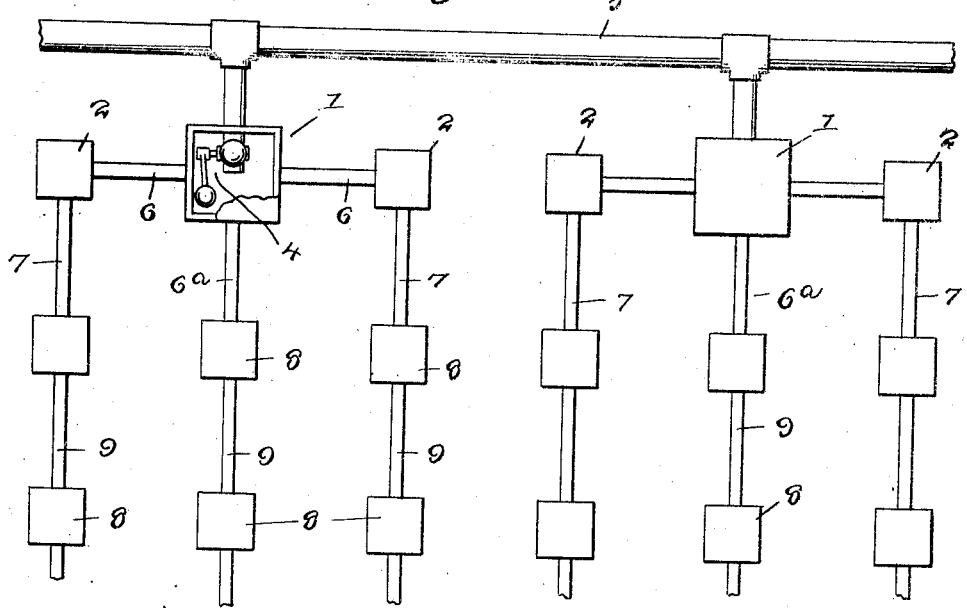
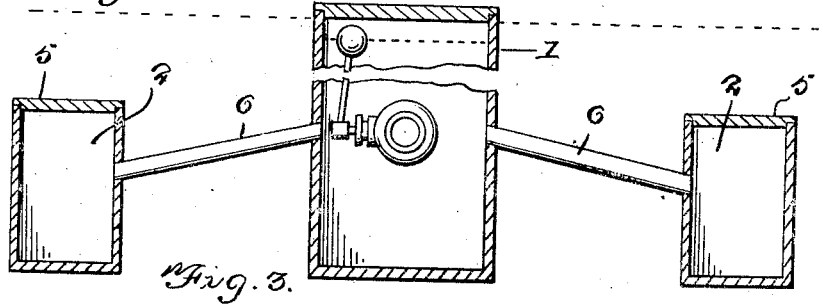
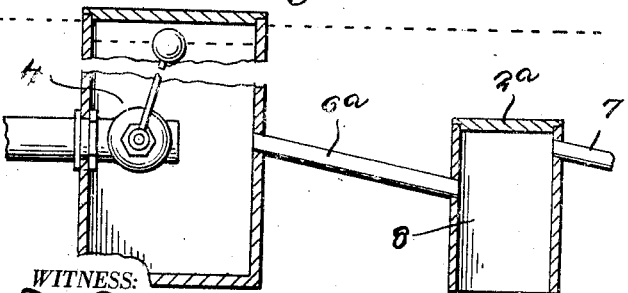
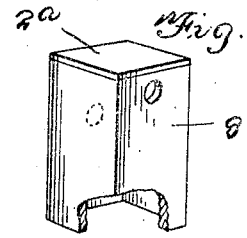
WITNESS:
E. R. Ruphart.
W. H. Lewis
INVENTOR.
BY
Victor J. Evans
ATTORNEY.

UNITED STATES PATENT OFFICE.

WILLIAM H. LEWIS, OF ATWELL, COLORADO.

IRRIGATION MEANS.

1,343,871. Specification of Letters Patent. Patented June 15, 1920.

Application filed August 18, 1919. Serial No. 318,226.

*To all whom it may concern:*

Be it known that I, WILLIAM H. LEWIS, a citizen of the United States, residing at Atwell, in the county of Las Animas and State of Colorado, have invented new and useful Improvements in Irrigation Means, of which the following is a specification.

The object of my present invention is the provision of simple and inexpensive means for supplying water to different parts of a field, and one that will not be liable to freeze or interfere with cultivation, and in which the supply of water is controlled at points adjacent to one side of the area to be irrigated, and is supplied from such points to sub-containers and to distributing means in a plane considerably below the surface of the ground as is desirable.

To the attainment of the foregoing, the invention consists in the peculiar and advantageous irrigation means hereinafter described and definitely claimed.

In the accompanying drawings:

Figure 1 is a plan view illustrative of the general arrangement adapted in the carrying out of my invention.

Fig. 2 is a broken section showing the relation of one of the main containers and its complementary sub-containers.

Fig. 3 is a similar view, at right angles to Fig. 2, and showing the relation of one of the main containers and the distributing means connected therewith.

Fig. 4 is a broken perspective of one of the boxes of the distributing means.

Similar numerals of reference designate corresponding parts in all of the views of the drawings.

The main containers 1, and the several sub-containers 2 may be made of wood, clay, metal, or any other material compatible with the purpose of the invention, as may also the boxes 2ª and conduit pipes of the distributing means. The main containers 1 are designed to be connected with a pipe 3 that leads from a suitable source of supply and is preferably located alongside of a field. Communication between the said pipe and the interior of the containers 1 is automatically controlled by float valves 4 which are arranged within the containers and are designed to prevent water from rising to the surface of the soil. Each of the sub-containers 2 is provided with a cover 5, designed to exclude dirt from the interior of the same and is also closed at its lower end.

In the preferred embodiment of my invention each main container 1 is connected at one side thereof to the supply pipe 3, and the other three sides of said main container may be utilized for the connection of conduits 6, through the medium of which the main container is connected with the sub-containers 2, and for the connection of a distributing conduit 6ª. When deemed expedient, the conduits 6 and 6ª may be pitched slightly downward from the main containers 1, so as to enable the passing water to clear the said conduits of any dirt that may be deposited therein. Some of the dirt will be carried to sub-containers 2 from which it may be removed at intervals. From the sub-containers 2 extend distributing pipes 7, arranged in parallelism with the pipes 6ª.

The distributing pipes 6ª and 7 lead downwardly to distributing boxes 8, Figs. 1, 3 and 4, that are open at their lower ends for the passage of water downwardly into the ground, and the said boxes 8 are connected through downwardly inclined pipes 9 with other boxes 8, and so on throughout the width of the field; the boxes 8 being preferably arranged at a slight distance apart, as indicated in Fig. 1.

In the preferred embodiment of my invention, the main containers 1 are extended to a slight extent above the surface of the ground, in order that access may be readily gained to the float valves for the purpose of securing the floats in raised position and thereby cut off the supply of water to the main containers 1 when the system shown is not in use. Manifestly any desired number of distributing pipes may be connected through the sub-containers 2 without affecting my invention.

It will be apparent from the foregoing that in the use of my novel means, the water is supplied to the ground at a considerable distance below the surface thereof, and hence the water will spread to a greater extent than when it is let into the ground adjacent to the surface; also, that the water is prevented from rising and standing on the surface by the use of the float valves. It will further be apparent that there is no liability of the improved means becoming clogged by dirt or foreign substance, inasmuch as each main container 1 and sub-container 2 has a considerable portion thereof extending below the conduit or conduits in communication with the same.

Having described my invention, what I claim and desire to secure by Letters-Patent, is:

1. Irrigation means comprising a container adapted to be connected with a source of water supply and to be arranged upright in the ground, a float valve in said container and arranged to control the supply of water thereto, a sub-container adapted to be disposed in the ground and below the surface thereof and in spaced relation to the main container and closed at its bottom and having a removable cover, a conduit intermediate the main container and the sub-container, and a distributing pipe connected with the sub-container.

2. Irrigation means comprising a container adapted to be connected with a source of water supply and to be arranged upright in the ground, a float valve in said container and arranged to control the supply of water thereto, a sub-container adapted to be disposed in the ground and below the surface thereof and in spaced relation to the main container and closed at its bottom and having a removable cover, a conduit intermediate the main container and the sub-container, and distributing pipes leading from the main container and the sub-container, respectively.

3. Irrigation means comprising a main container, a water supply pipe leading to the interior of said container at one side thereof, a float valve disposed in said container for controlling the supply of water thereto, conduits adapted to be arranged under the surface of the ground and leading from other sides of the container and pitched downwardly in a direction away from the same, sub-containers disposed below the surface of the ground and connected to the outer ends of two of the said conduits and closed at their lower ends, and having removable covers, distributing pipes connected with the main container and sub-containers and arranged below the surface of the ground, and boxes connected to said pipes and open at their lower ends and adapted to lead water into the ground.

4. In irrigation means, the combination of a container adapted to be disposed in the ground adjacent to the surface thereof, distributing means adapted for arrangement in the ground and connected with said container, means for supplying water to the container, and float means for controlling the passage of water to the container.

In testimony whereof I affix my signature.

WILLIAM H. LEWIS.